United States Patent
Ueno et al.

(10) Patent No.: US 12,012,509 B2
(45) Date of Patent: Jun. 18, 2024

(54) PHOTOCURABLE COMPOSITION AND CURED MATERIAL THEREOF

(71) Applicant: THREEBOND CO., LTD., Tokyo (JP)

(72) Inventors: Kazuyuki Ueno, Tokyo (JP); Yoshihide Arai, Tokyo (JP); Takashi Nemoto, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 822 days.

(21) Appl. No.: 17/057,099

(22) PCT Filed: May 22, 2019

(86) PCT No.: PCT/JP2019/020349
§ 371 (c)(1),
(2) Date: Nov. 19, 2020

(87) PCT Pub. No.: WO2019/230538
PCT Pub. Date: Dec. 5, 2019

(65) Prior Publication Data
US 2021/0206959 A1 Jul. 8, 2021

(30) Foreign Application Priority Data

May 30, 2018 (JP) .............................. 2018-103020

(51) Int. Cl.
*C08L 33/10* (2006.01)

(52) U.S. Cl.
CPC ......... *C08L 33/10* (2013.01); *C08L 2205/035* (2013.01)

(58) Field of Classification Search
CPC .... C08L 33/10; C08L 2205/035; C08L 71/12; C08F 290/067; C08F 2/44; C08F 290/062; C08F 2/50; C08F 220/18; C08K 5/3432; C08K 5/3467
See application file for complete search history.

(56) References Cited

U.S. PATENT DOCUMENTS

| | | | |
|---|---|---|---|
| 4,877,922 A | 10/1989 | Sasaki et al. | |
| 5,214,085 A | 5/1993 | Patel et al. | |
| 2009/0111904 A1 | 4/2009 | Odaka et al. | |
| 2015/0024218 A1 | 1/2015 | Koga et al. | |
| 2016/0329522 A1 | 11/2016 | Hagihara et al. | |

FOREIGN PATENT DOCUMENTS

| | | | | |
|---|---|---|---|---|
| CN | 104169388 A | 11/2014 | | |
| CN | 104403277 A | 3/2015 | | |
| JP | H03-147892 A | 6/1991 | | |
| JP | H06-25363 A | 2/1994 | | |
| JP | H08-283608 A | 10/1996 | | |
| JP | H11-21470 A | 1/1999 | | |
| JP | 2001-131402 A | 5/2001 | | |
| JP | 2003-026715 A | 1/2003 | | |
| JP | 2003-238845 A | 8/2003 | | |
| JP | 2013-001832 A | 1/2013 | | |
| JP | 2015-124254 A | 7/2015 | | |
| JP | 2015-194555 A | 11/2015 | | |
| JP | 2017-019903 A | 1/2017 | | |
| KR | 10-1996-0004683 B1 | 4/1996 | | |
| TW | 200801141 A | 1/2008 | | |
| TW | 201336959 A | 9/2013 | | |
| WO | 2007/125746 A1 | 11/2007 | | |
| WO | 2013/122144 A1 | 8/2013 | | |
| WO | 2015/098647 A1 | 7/2015 | | |
| WO | WO-2017138379 A1 * | 8/2017 | ................ | C08J 5/18 |
| WO | 2019/045071 A1 | 3/2019 | | |

OTHER PUBLICATIONS

English machine translation of WO 2017/138379 (Year: 2017).*
PCT, International Search Report for the corresponding patent application No. PCT/JP2019/020349, dated Aug. 13, 2019, with English translation.
Office Action for the corresponding Chinese Patent Application No. 201980029817.2, dated Aug. 2, 2022, with English translation.
Office Action dated Feb. 28, 2023 for the corresponding Japanese Patent Application No. 2020-522129, with English translation (6 pages).
Office Action for the corresponding Taiwanese Patent Application No. 108117882, dated Aug. 18, 2022, with English translation.
Office Action dated Nov. 29, 2022 for the corresponding Japanese patent application No. 2020-522129, with English translation.
Office Action dated Feb. 15, 2023 for the corresponding Chinese Patent Application No. 201980029817.2, with English translation (15 pages).
Office Action dated Oct. 10, 2023 for the corresponding Korean Patent Application No. 10-2020-7031580, with English translation.

* cited by examiner

*Primary Examiner* — Angela C Scott
(74) *Attorney, Agent, or Firm* — Lucas & Mercanti, LLP

(57) ABSTRACT

The present invention provides a photocurable composition containing an ultraviolet absorber, which yields a cured material thereof having a high cutting capability against ultraviolet rays from the outside, a low yellow index, and colorlessness and transparency, both immediately after preparing the same and after a lapse of time of being left in a severe environment such as a high-temperature and high-humidity environment, an environment exposed to water or light, and the like. The present invention relates to a sheet-shaped photocurable composition including the following components (A) to (E): a component (A): a (meth)acrylate compound; a component (B): a film forming resin; a component (C): a photoinitiator; a component (D): a compound having a specific skeleton structure; a component (E): a compound having a specific group in the molecule.

6 Claims, No Drawings

PHOTOCURABLE COMPOSITION AND CURED MATERIAL THEREOF

CROSS REFERENCE TO RELATED APPLICATION

This Application is a 371 of PCT/JP2019/020349 filed on May 22, 2019 which, in turn, claimed the priority of Japanese Patent Application No. 2018-103020 filed on May 30, 2018, both applications are incorporated herein by reference.

TECHNICAL FIELD

The present invention relates to a photocurable composition and a cured material thereof. More specifically, the present invention relates to a photocurable composition including an ultraviolet absorber, which can form a cured material that hardly transmits ultraviolet rays from the outside after curing and causes less coloring.

BACKGROUND ART

In recent years, organic EL elements have attracted attention as a light emitting element which can perform high-luminance light emission by a low-voltage direct current drive.

Furthermore, WO 2015/098647 A (corresponding to US 2016/0,329,522 A) describes that organic layers such as a light emitting layer and the like of an organic EL element have a problem in easy deterioration of transparency by ultraviolet rays. Then, this publication proposes a technique of coating an organic EL layer and an organic EL element with a resin layer containing an ultraviolet absorber.

SUMMARY OF INVENTION

However, the resin layer described in WO 2015/098647 A (corresponding to US 2016/0,329,522 A) is constituted with an elastomer or rubber, and thus, in the first place, there is a problem that the organic EL element and the organic EL layer as an adherend are damaged due to heating during compression bonding. In addition, there is a risk that the organic EL element and the organic EL layer may be deteriorated in a reliability test due to an effect of uncured components.

On the other hand, in a case where a resin layer containing an ultraviolet absorber is formed of a photocurable resin having a high adhesive force, not of an elastomer or rubber, as a main component, a problem due to heating during compression bonding does not occur. However, even in such a resin layer, it is difficult to form a colorless and transparent cured material from the viewpoint that the ultraviolet absorber itself causes coloring. Furthermore, in the worst case, there is a problem that the photocurability is deteriorated due to an unfavorable effect of the ultraviolet absorber in some cases. In addition, from the viewpoint that there is a demand for colorlessness and transparency for application to a display device such as an organic EL element and the like, a curable resin that involves coloring cannot be used for the application.

As described above, from the viewpoint that a photocurable composition to which an ultraviolet absorber had been added had low photocurability and made it difficult to form a colorless and transparent cured material in the related art, it was difficult to form the composition which could be applied to a display device such as an organic EL element and the like. Furthermore, it is difficult to maintain a low light transmittance or yellow index after a moisture resistance test at 60° C.×95% RH, 85° C.×85% RH, or the like, or an endurance test as an environmental test such as a test using an accelerated weather resistance tester (weather meter).

Solution to Problem

The present inventors have conducted intensive studies in order to accomplish the object, and as a result, they have discovered a method relating to a photocurable composition which contains an ultraviolet absorber and is substantially colorless and transparent (that is, has high transparency in the visible region) both in a normal state and after an endurance test, thereby leading to completion of the present invention.

That is, according to the present invention, provided is a photocurable composition containing an ultraviolet absorber, which yields a cured material thereof having a high cutting capability against ultraviolet rays from the outside, a low yellow index, and colorlessness and transparency, both immediately after preparing the same and after a lapse of time of being left in a severe environment such as a high-temperature and high-humidity environment, an environment exposed to water or light, and the like.

DESCRIPTION OF EMBODIMENTS

Hereinafter, embodiments of the present invention will be described. Furthermore, the present invention is not limited to the following embodiments. In the present specification, in an expression with "to" or "from" indicating a range from an upper limit value to a lower limit value, the range also includes the upper and lower limit values themselves. That is, "X to Y" or "from X to Y" indicating the range includes X and Y, and means "X or more and Y or less". In addition, operations and measurements of physical properties and the like are performed under conditions of room temperature (20 to 25° C.)/a relative humidity of 40 to 50% RH unless otherwise specified.

Moreover, in the present specification, an acryloyl group and a methacryloyl group are collectively referred to as a (meth)acryloyl group. Furthermore, a compound having a (meth)acryloyl group is also referred to as (meth)acrylate. In addition, similarly, a compound and the like including (meth), such as (meth)acrylic acid and the like are also generic terms for a compound having "meth" and a compound not having "meth" in the names.

Furthermore, in the present specification, a photocurable composition before curing, which has been processed into a sheet shape, is referred to as a "sheet-shaped photocurable composition". In addition, a "cured material" refers to a product obtained by subjecting a photocurable composition to polymerization by irradiation with light in a state where the composition does not include a solvent.

One aspect of the present invention relates to the following [1]:

A sheet-shaped photocurable composition including the following components (A) to (E):
- a component (A): a (meth)acrylate compound,
- a component (B): a film forming resin,
- a component (C): a photoinitiator,
- a component (D): a compound having a skeleton structure represented by the general formula 1 which will be described later, and a component (E): a compound having a group represented by the general formula 4 which will be described later.

Moreover, the present invention also includes aspects according to the following [2] to [7] as non-limiting examples of preferred aspects.

[2] The sheet-shaped photocurable composition as described in [1], in which the component (D) includes the following component (D-1) and the following component (D-2):
 a component (D-1): a compound having a skeleton structure represented by the general formula 2 which will be described later, and
 a component (D-2): a compound having a skeleton structure represented by the general formula 3 which will be described later.

[3] The sheet-shaped photocurable composition as described in [1] or [2], in which the component (E) includes a compound having two or more groups represented by the general formula 4 which will be described later in the molecule.

[4] The sheet-shaped photocurable composition as described in any one of [1] to [3], in which the total amount of the component (D) and the component (E) is 0.1 to 5.0 parts by mass with respect to 100 parts by mass of the total mass of the components (A) to (C).

[5] The sheet-shaped photocurable composition as described in any one of [1] to [4], in which the component (A) includes a (meth)acrylate oligomer and a (meth)acrylate monomer.

[6] The sheet-shaped photocurable composition as described in any one of [1] to [5], in which the component (B) is a phenoxy resin.

[7] A cured material of the sheet-shaped photocurable composition as described in any one of [1] to [6].

<Photocurable Composition and Method for Preparing the Same>

One aspect of the present invention relates to a sheet-shaped photocurable composition including the components (A) to (E). According to one aspect of the present invention, provided is a sheet-shaped photocurable composition containing an ultraviolet absorber, which yields a cured material thereof having a high cutting capability against ultraviolet rays from the outside, a low yellow index, and colorlessness and transparency, both immediately after preparing the same and after a lapse of time of being left in a severe environment such as a high-temperature and high-humidity environment, an environment exposed to water or light, and the like. That is, with the sheet-shaped photocurable composition according to one aspect of the present invention, it is possible to form a cured material which can cut ultraviolet rays from the outside, has a low yellow index, and is substantially colorless and transparent. Further, with the photocurable composition, it is possible to maintain a high cutting capability against ultraviolet rays from the outside, a low yellow index, and a high colorlessness and transparency even after the endurance test. In addition, a display element can reproduce the original color even when the photocurable composition has been applied thereto, and therefore, the photocurable composition can be suitably used for a display device such as an organic EL and the like.

When a cured material obtained after photocuring the sheet-shaped photocurable composition according to one aspect of the present invention has a thickness of 150 μm, the yellow index (yellowness) of the cured material is not particularly limited, but is preferably 3.0 or less, more preferably 2.7 or less, and still more preferably 2.5 or less (lower limit value of 0).

Moreover, when a cured material obtained after photocuring the sheet-shaped photocurable composition according to one aspect of the present invention has a thickness of 150 μm, the light transmittance of the cured material at a wavelength of 385 nm is not particularly limited, but is preferably 5% or less, more preferably 1% or less, and still more preferably 0.7% (lower limit value of 0%).

Hereinbelow, the respective components of the photocurable composition will be described in detail. However, the present invention is not limited thereto.

[Component (A)]

The component (A) which can be used in one aspect of the present invention is a compound having a (meth)acryloyl group as a functional group ((meth)acrylate compound). As the component (A), a combination of an oligomer and a monomer is preferable from the viewpoint of improving the adhesive force and adjusting the viscosity.

The weight-average molecular weight of the oligomer is not particularly limited, but is preferably 10,000 to 100,000, more preferably 25,000 to 90,000, and particularly preferably 30,000 to 80,000. When the weight-average molecular weight is 10,000 or more, the curability is improved. In addition, when the weight-average molecular weight is 100,000 or less, the viscosity is lower and the affinity at an interface at a time of being adhered to an adherend is improved. Here, the weight-average molecular weight of the oligomer refers to a weight-average molecular weight in terms of polystyrene, as measured by gel permeation chromatography.

As the oligomer which can be used in the component (A), a (meth)acrylate oligomer is preferable, and from the viewpoint of improving the adhesive force, a urethane-modified (meth)acrylate oligomer is more preferable, and a urethane-modified (meth)acrylate oligomer having a polycarbonate in a main skeleton is particularly preferable.

As the urethane-modified (meth)acrylate oligomer, either a synthetic product or a commercially available product may be used. Specific examples of the commercially available product include, but are not limited to, UN-004RU manufactured by Negami Chemical Industrial Co., Ltd., and the like.

The urethane-modified (meth)acrylate oligomer can be synthesized from, for example, a reaction product of (i) a polyol compound having two or more hydroxyl groups in the molecule, (ii) a compound having two or more isocyanate groups in the molecule, and (iii) a (meth)acrylate containing at least one or more hydroxyl groups in the molecule.

The compound having two or more isocyanate groups in the molecule (ii) is not particularly limited, but examples thereof include an aromatic polyisocyanate, an alicyclic polyisocyanate, an aliphatic polyisocyanate, and the like.

The aromatic polyisocyanate is not particularly limited, but examples thereof include 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, naphthalene-1,5-diisocyanate, triphenylmethane triisocyanate, and the like.

The alicyclic polyisocyanate is not particularly limited, but examples thereof include isophorone diisocyanate, bis(4-isocyanatocyclohexyl)methane, 1,3-bis(isocyanatomethyl)cyclohexane, 1,4-bis(isocyanatomethyl)cyclohexane, norbornane diisocyanate, bicycloheptane triisocyanate, and the like.

The aliphatic polyisocyanate is not particularly limited, but examples thereof include hexamethylene diisocyanate, 1,3,6-hexamethylene triisocyanate, 1,6,11-undecatriisocyanate, and the like. Among these, diisocyanates such as isophorone diisocyanate, hexamethylene diisocyanate, and the like are preferable.

Among those, the aliphatic polyisocyanate and the alicyclic polyisocyanate are preferable from the viewpoint of obtaining a cured material having flexibility. These may be used singly or in combination of a plurality thereof.

The polyol compound having two or more hydroxyl groups in the molecule in (i) is not particularly limited, but examples thereof include polyether polyol, polyester polyol, caprolactone diol, bisphenol polyol, polyisoprene polyol, hydrogenated polyisoprene polyol, polybutadiene polyol, hydrogenated polybutadiene polyol, castor oil polyol, polycarbonate diol, and the like. Among these, polycarbonate diol, polybutadiene polyol, or hydrogenated polybutadiene polyol is preferable from the viewpoint of excellent transparency and endurance, and polycarbonate diol is particularly preferable from the viewpoint that it does not cause white turbidity of a cured material in an atmosphere with a high temperature and a high humidity. That is, a urethane-modified (meth)acrylate oligomer having a polycarbonate in the main skeleton, which is synthesized using the polycarbonate diol, can be preferably used as the component (A) from the viewpoint that it hardly causes occurrence of white turbidity of a cured material in an atmosphere with a high temperature and a high humidity. These may be used singly or in combination of a plurality thereof.

The (meth)acrylate containing at least one or more hydroxyl groups in the molecule in (iii) is not particularly limited, but examples thereof include mono(meth)acrylates of dihydric alcohols such as ethylene glycol, propylene glycol, 1,3-propanediol, 1,3-butanediol, 1,4-butanediol, polyethylene glycol, and the like, mono(meth)acrylates or di(meth)acrylates of trihydric alcohols such as trimethylolethane, trimethylolpropane, glycerin, and the like; and so on. Among these, the mono(meth)acrylates of dihydric alcohols are preferable, and the mono(meth)acrylate of ethylene glycol is more preferable, from the viewpoint that a cured material having excellent flexibility can be obtained. These may be used singly or in combination of a plurality thereof.

A method for synthesizing the urethane-modified (meth)acrylate oligomer is not particularly limited, and a known method can be used. Examples thereof include the following methods. First, the polyol compound having two or more hydroxyl groups in the molecule (i) and the isocyanate compound having two or more isocyanate groups in the molecule (ii) are reacted in a diluent to obtain a urethane prepolymer. At this time, a molar ratio of the compound of (i) to the compound of (ii) (polyol compound:isocyanate compound) is not particularly limited, but is preferably 3:1 to 1:3, and more preferably a ratio of 2:1 to 1:2. Furthermore, the diluent is not particularly limited, but examples thereof include methyl ethyl ketone, methoxyphenol, and the like. Then, the isocyanate groups remaining in the obtained urethane prepolymer are reacted with the (meth)acrylate containing at least one or more hydroxyl groups in the molecule (iii) in a sufficient amount for a reaction with the isocyanate groups to synthesize a urethane (meth)acrylate oligomer.

Moreover, a catalyst used in the synthesis is not particularly limited, but examples thereof include lead oleate, tetrabutyltin, antimony trichloride, triphenyl aluminum, trioctyl aluminum, dibutyltin dilaurate, copper naphthenate, zinc naphthenate, zinc octoate, zinc octenoate, zirconium naphthenate, cobalt naphthenate, tetra-n-butyl-1,3-diacetyloxydistannoxane, triethylamine, 1,4-diaza[2,2,2]bicyclooctane, N-ethylmorpholine, and the like. Among these, dibutyltin dilaurate, zinc naphthenate, zinc octoate, and zinc octenoate are preferable from the viewpoint that a cured material having a high activity and a more excellent transparency can be obtained. It is preferable that these catalysts are used in the amount of 0.0001 to 10 parts by mass with respect to 100 parts by mass of the total mass of the reactants. In addition, the reaction temperature is usually preferably 10 to 100° C., and particularly preferably 30 to 90° C.

The urethane-modified (meth)acrylate oligomer may be used after being diluted with a solvent or a monomer below, in a step in which the oligomer is used as a raw material for the photocurable composition.

These oligomers may be used singly or in combination of a plurality thereof.

Examples of the monomer which can be used as the component (A) include monofunctional, bifunctional, trifunctional, or tetrafunctional or higher polyfunctional monomers. A (meth)acrylate monomer is preferable, and a bifunctional (meth)acrylate monomer is particularly preferable.

The molecular weight of the monomer is not particularly limited, but from the viewpoint that the viscosity of the photocurable composition is lowered, the molecular weight is preferably less than 10,000, more preferably 5,000 or less, still more preferably 1,500 or less, and particularly preferably 1,000 or less. Here, the molecular weight of the monomer refers to a sum of atomic weights.

The monofunctional monomer is not particularly limited, but examples thereof include lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, glycerol (meth)acrylate, modified butyl (meth)acrylate, epichlorohydrin-modified phenoxy(meth)acrylate, N,N-dimethylaminoethyl (meth)acrylate, N,N-diethylaminoethyl (meth)acrylate, morpholino(meth)acrylate, polyethylene glycol mono(meth)acrylate, polypropylene glycol mono(meth)acrylate, polyoxytetramethylene glycol mono(meth)acrylate, and the like.

The bifunctional monomer is not particularly limited, but examples thereof include neopentyl glycol di(meth)acrylate, bisphenol A di(meth)acrylate, epichlorohydrin-modified bisphenol A di(meth)acrylate, stearic acid-modified pentaerythritol di(meth)acrylate, dicyclopentenyl di(meth)acrylate, di(meth)acryloyl isocyanurate, polyethylene glycol di(meth)acrylate, polypropylene glycol di(meth)acrylate, polyoxytetramethylene glycol di(meth)acrylate, and the like.

The trifunctional monomer is not particularly limited, but examples thereof include trimethylolpropane tri(meth)acrylate, pentaerythritol tri(meth)acrylate, epichlorohydrin-modified trimethylolpropane tri(meth)acrylate, epichlorohydrin-modified glycerol tri(meth)acrylate, tris((meth)acryloyloxyethyl)isocyanurate, and the like.

The tetrafunctional or higher polyfunctional monomer is not particularly limited, but examples thereof include ditrimethylolpropane tetra(meth)acrylate, pentaerythritol tetra(meth)acrylate, dipentaerythritol monohydroxypenta(meth)acrylate, alkyl-modified dipentaerythritol penta(meth)acrylate, dipentaerythritol hexa(meth)acrylate, and the like. These polymerizable monomers may be used singly or in combination of a plurality thereof.

Among these, as the monomer, the mono- to hexafunctional monomers are preferable, the mono- to tri-functional monomer is more preferable, the mono- or bi-functional monomers are still more preferable, and the bi-functional monomer is particularly preferable.

Furthermore, as the monomer, (meth)acrylate containing an ether bond and a (meth)acryloyl group is preferable, and a polyether monomer having 8 to 30 repeating structures of the ether bonds in one molecule (polyether (meth)acrylate having 8 to 30 repeating structures of the ether bonds in one molecule) is the most preferable. In a case where there are 8 or more repeating structures of the ether bonds, it becomes more difficult for the white turbidity of a cured material due to separation from moisture permeating from the outside into the cured material to occur in an atmosphere with a high temperature and a high humidity. On the other hand, in a case where there are 30 or less repeating structures of the ether bonds, it becomes more difficult for the polyether monomers to be crystallized with the same kinds of the polyether monomers, and it also becomes more difficult for the white turbidity of the cured material to occur.

The (meth)acrylate containing an ether bond and a (meth) acryloyl group is not particularly limited, but examples thereof include polyethylene glycol mono(meth)acrylate, polyethylene glycol di(meth)acrylate, polypropylene glycol mono(meth)acrylate, polypropylene glycol di(meth)acrylate, polyoxytetramethylene glycol mono(meth)acrylate, polyoxytetramethylene glycol di(meth)acrylate, and the like. Among these, polyethylene glycol di(meth)acrylate is preferable, and polyethylene glycol dimethacrylate is more preferable.

The molecular weight of the (meth)acrylate containing an ether bond and a (meth)acryloyl group is preferably in the range of 200 to 5,000, more preferably 250 to 3,000, and still more preferably 300 to 1,500.

As the (meth)acrylate containing an ether bond and a (meth)acryloyl group, either a commercially available product or a synthetic product may be used. Specific examples of the commercially available product include, but are not limited to, NK ESTER (trademark) series M-90G, AM-130G, M-230G, A-400, A-600, APG-700, A-1000, 9G, 14G, 23G, 1206PE, and the like, manufactured by Shin-Nakamura Chemical Co., Ltd., BLEMMER (registered trademark) series PDE-600, PDP-700, ADE-600, and the like, manufactured by NOF Corporation, LIGHT ESTER series 130MA, 130A, 14EG, 14EG-A, and the like, manufactured by Kyoeisha Chemical Co., Ltd.

The number of functional groups (the number of (meth)acryloyl groups) of the monomer may be 1 or more, and these may be used singly or in combination of a plurality thereof.

The monomer used for dilution of the urethane-modified (meth)acrylate oligomer is not particularly limited, but from the viewpoint of decreasing the viscosity of a photocurable composition and improving the handling properties, it is preferably a monofunctional alicyclic (meth)acrylate, a bifunctional alicyclic (meth)acrylate, a tetrafunctional alicyclic (meth)acrylate or a polyfunctional alicyclic (meth) acrylate such as a tetrafunctional or higher functional alicyclic (meth)acrylate, more preferably the monofunctional alicyclic (meth)acrylate, still more preferably isobornyl (meth)acrylate, and particularly preferably isobornyl methacrylate.

From the viewpoint of decreasing the viscosity of the photocurable composition and improving the handling properties, the blending amount (addition amount, content) of the monomer is preferably 200 parts by mass or less, more preferably 100 parts by mass or less, and still more preferably 50 parts by mass or less with respect to 100 parts by mass of the oligomer. Further, the blending amount (addition amount, content) of the monomer is preferably more than 0 part by mass.

[Component (B)]

The component (B) which can be used in one aspect of the present invention is a film forming resin. The component (A) is liquid at 25° C. in many cases, whereas the component (B) is solid or has almost no fluidity at 25° C., and therefore, the component (B) is added in order to enable a photocurable composition to be formed in a sheet shape in an atmosphere at 25° C. Therefore, the sheet-shaped photocurable composition according to one aspect of the present invention has no fluidity at 25° C., and unlike the photocurable composition which is liquid at 25° C., the composition does not overflow from an end part of an adherend when used to stick plate-shaped adherends.

Specific examples of the component (B) are not particularly limited, and include known thermoplastic resins, known elastomers, and the like but the presence or absence of a reactive functional group such as an epoxy group and the like is not particularly limited.

Among those, a particularly preferable component (B) is a phenoxy resin. The phenoxy resin is, for example, a polymer synthesized from bisphenol A and epichlorohydrin, or a polymer obtained by polymerizing a polyfunctional epoxy resin such as a bisphenol type epoxy resin and the like.

Specific examples of the phenoxy resin are not particularly limited, but examples thereof include a bisphenol type phenoxy resin, a novolac type phenoxy resin, a naphthalene type phenoxy resin, a biphenyl type phenoxy resin, and the like. These may be used singly or in combination of a plurality thereof. As the phenoxy resin, the bisphenol type phenoxy resin is preferable from the viewpoint of good adhesion to a glass or a plastic of a protective panel. Among these, a mixture of a bisphenol A type phenoxy resin and a bisphenol F type phenoxy resin, or a phenoxy resin which is a copolymer of a bisphenol A type epoxy resin (phenoxy resin) and a bisphenol F type epoxy resin (phenoxy resin) is preferable, and the mixture of a bisphenol A type phenoxy resin and a bisphenol F type phenoxy resin is more preferable, from the viewpoint of good compatibility with the component (A) according to one aspect of the present invention. These may be used singly or in combination of a plurality thereof.

The weight-average molecular weight of the phenoxy resin is not particularly limited, but is preferably 10,000 to 100,000. Here, the weight-average molecular weight of the phenoxy resin refers to a weight-average molecular weight in terms of polystyrene, as measured by gel permeation chromatography.

As the phenoxy resin of the component (B), either a commercially available product or a synthetic product may be used. Specific examples of the commercially available product include, but are not limited to, Phenotote (registered trademark) series YP-50, YP-50S, YP-55, YP-70, ZX-1356-2, FX-316, and the like, manufactured by NIPPON STEEL Chemical & Material Co., Ltd., jER (registered trademark) series 1256, 4250, 4275, and the like, manufactured by Mitsubishi Chemical Corporation, and PKHB, PKHC, PKHH, PKHJ, PKFE, and the like, manufactured by Tomoe Engineering Co., Ltd.

The component (B) may be used after being diluted with a solvent in a step in which it is used as a raw material for the photocurable composition.

The addition amount of the component (B) in the photocurable composition is not particularly limited, but is preferably 1 to 50 parts by mass, more preferably 5 to 45 parts by mass, and still more preferably 10 to 40 parts by mass with respect to 100 parts by mass of the component (A). When the addition amount is 1 part by mass or more, the film forming property is further improved, the occurrence of stickiness of the photocurable composition is further suppressed, and the peelability of a mold-released film or the like is further improved. In addition, when the addition amount is 50 parts by mass or less, the brittleness of a cured material is further improved.

[Component (C)]

The component (C) used in one aspect of the present invention is a photoinitiator. The photoinitiator is a compound that decomposes upon irradiation with active energy rays such as ultraviolet rays, visible light, and the like to generate a radical species, a cation species, or an anion species.

The component (C) is not particularly limited, but examples thereof include an acetophenone-based photoinitiator, a benzoin-based photoinitiator, a benzophenone-based photoinitiator, a thioxanthone-based photoinitiator, an acylphosphine oxide-based photoinitiator, and the like. These may be used singly or in combination of two or more kinds thereof.

The acetophenone-based photoinitiator is not particularly limited, but examples thereof include diethoxyacetophenone, 2-hydroxy-2-methyl-1-phenylpropan-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propan-1-one, 2-benzyl-2-dimethylamino-1-(4-morpholinophenyl)butanone, a 2-hydroxy-2-methyl-1-[4-(1-methylvinyl)phenyl]propanone oligomer, and the like. These may be used singly or in combination of two or more kinds thereof.

The benzoin-based photoinitiator is not particularly limited, but examples thereof include benzoin, benzoin methyl ether, benzoin ethyl ether, benzoin isopropyl ether, benzoin isobutyl ether, and the like. These may be used singly or in combination of two or more kinds thereof.

The benzophenone-based photoinitiator is not particularly limited, but examples thereof include benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzenemethanaminium bromide, (4-benzoylbenzyl)trimethylammonium chloride, or the like. These may be used singly or in combination of two or more kinds thereof.

The thioxanthone-based photoinitiator is not particularly limited, but examples thereof include 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthon-9-one methochloride, and the like. These may be used singly or in combination of two or more kinds thereof.

The acylphosphine oxide-based photoinitiator is not particularly limited, but examples thereof include bis(2,4,6-trimethylbenzoyl)-phenylphosphine oxide, 2,4,6-trimethylbenzoyl-diphenylphosphine oxide, 2,4,6-trimethylbenzoylphenylethoxyphosphine oxide, and the like. These may be used singly or in combination of two or more kinds thereof.

Among these, the acylphosphine oxide-based photoinitiator is preferably included since it is easily cured with energy rays in the visible region and the photocurability is improved. However, it is preferable to add an appropriate amount of the acylphosphine oxide-based photoinitiator from the viewpoint that the photocurable composition itself may become yellow in some cases with an excessive addition of the acylphosphine oxide-based photoinitiator to the photocurable composition. Among the acylphosphine oxide photoinitiators, 2,4,6-trimethylbenzoyl-diphenylphosphine oxide is particularly preferable.

As the photoinitiator, either a commercially available product or a synthetic product may be used. Specific examples of the commercially available products include, but are not limited to, IRGACURE (registered trademark) series TPO and the like, manufactured by BASF.

The addition amount (content) of the component (C) in the photocurable composition is not particularly limited, but is preferably 0.1 to 5.0 parts by mass, more preferably 0.5 to 4.0 parts by mass, and still more preferably 1.0 to 3.0 parts by mass with respect to 100 parts by mass of the component (A). When the addition amount is 0.1 parts by mass or more, the photocurability is better exhibited. Further, when the addition amount is 5.0 parts by mass or less, the photocurable composition is less likely to become colored.

[Component (D)]

The component (D) used in one aspect of the present invention is a compound having a skeleton structure represented by the following general formula 1. The compound acts as an ultraviolet absorber. Furthermore, the compound having a skeleton structure represented by the following general formula 1 also includes a derivative thereof in which hydrogen in the main skeleton represented by the general formula 1 is substituted with another organic group. However, it is not construed to include a multimer in which a plurality of the main skeletons represented by the general formula 1 are bonded to each other.

[Chemical Formula 1]

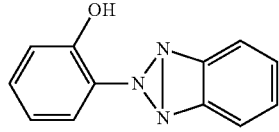 [SMILES: Oc1ccccc1-n1n2c3ccccc3n12]

Formula 1

The compound having the skeleton structure represented by the general formula 1 is also effective for realizing a preferred aspect of the present invention in which a light transmittance of a cured material of a photocurable composition including the components (A) to (E) at a wavelength of 385 nm is maintained to be 5% or less and a yellow index (yellowness) of the cured material is 3.0 or less, in the state of being sandwiched between 0.7 mm-thick alkali-free glass plates, when the cured material is obtained after photocuring the photocurable composition and has a thickness of 200 μm or less.

Furthermore, the lower limit value of the yellow index is 0, and the lower limit value of the light transmittance at a wavelength of 385 nm is 0%.

The light transmittance at a wavelength of 385 nm and the yellow index (yellowness) can be measured by a visible/ultraviolet spectroscopy method and calculated.

The light transmittance at a wavelength of 385 nm can be measured by the following method. First, a sheet-shaped photocurable composition sandwiched between alkali-free glass plates with a thickness of 0.7 mm×a width of 100 mm×a length of 100 mm is prepared, and irradiated with ultraviolet rays having an integrated light amount of 30 kJ/m² to manufacture a test piece in which two sheets of alkali-free glass are stuck with a cured material of the sheet-shaped photocurable composition. Then, a light transmittance can be determined by performing a light transmittance measurement according to a visible/ultraviolet spectroscopy method using the test piece, and reading the light transmittance (%) at a wavelength of 385 nm. Here, UV-2450 manufactured by Shimadzu Corporation can be used as a visible/ultraviolet spectrophotometer. Further, the details of the measuring method will be described in Examples.

The yellow index can be measured by the following method. First, a sheet-shaped photocurable composition sandwiched between alkali-free glass plates with a thickness of 0.7 mm×a width of 100 mm×a length of 100 mm is prepared, and irradiated with ultraviolet rays having an integrated light amount of 30 kJ/m² to manufacture a test piece in which two sheets of alkali-free glass are stuck with a cured material of the sheet-shaped photocurable composition. Then, a light transmittance can be calculated in accordance with JIS K7373-2006 by performing a light transmittance measurement at wavelengths of the range of wavelength 800 nm to 300 nm by the light transmittance measurement according to a visible/ultraviolet spectroscopy method using the test piece. Here, UV-2450 manufactured by Shimadzu Corporation can be used as a visible/ultraviolet spectrophotometer. Further, the details of the measuring method will be described in Examples.

Moreover, examples of a preferred structure of the component (D) include a compound having a skeleton structure represented by the following general formula 2 which is a component (D-1) and a compound having a skeleton structure represented by the following general formula 3 which is a component (D-2). Further, the compound having a skeleton structure represented by the following general formula 2 and the compound having a skeleton structure represented by the following general formula 3 also include each of derivatives thereof, in which hydrogen in the main skeleton represented by the following general formula 2 and the main skeleton represented by the following general formula 3 is substituted with another organic group. However, it is not construed to include a multimer in a plurality of the main skeletons represented by the following general formula 2 or the main skeletons represented by the following general formula 3 are bonded to each other.

[Chemical Formula 2]

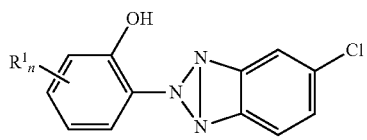

Formula 2

[Chemical Formula 3]

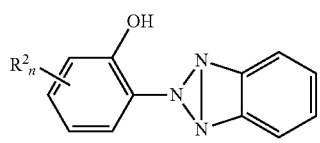

Formula 3

In the general formula 2 and the general formula 3, $R^1_n$ represents the presence of n $R^1$ groups, $R^2_n$ represents the presence of n $R^2$ groups, R's each independently represent a hydrocarbon group, $R^2$'s each independently represent a hydrocarbon group, and n represents an integer of 0 to 4. Further, it is not construed that the skeleton structure represented by the general formula 3 includes the skeleton structure represented by the general formula 2. That is, it is not construed that the compound having the skeleton structure represented by the general formula 3 includes the compound having the skeleton structure represented by the general formula 2.

The hydrocarbon group in the general formula 2 is not particularly limited, but is preferably a hydrocarbon group having 1 to 8 carbon atoms, more preferably a hydrocarbon group having 1 to 4 carbon atoms, still more preferably a hydrocarbon group having 1 carbon atom (methyl group) or a hydrocarbon group having 4 carbon atoms, and particularly preferably a methyl group or a tert-butyl group. In addition, n is preferably 1, 2 or 3, more preferably 1 or 2, and still more preferably 2.

The hydrocarbon group in the general formula 3 is not particularly limited, but is preferably a hydrocarbon group having 1 to 8 carbon atoms, more preferably a hydrocarbon group having 5 to 8 carbon atoms, still more preferably a hydrocarbon group having 8 carbon atoms, and particularly preferably a tert-octyl group. In addition, n is preferably 1, 2 or 3, more preferably 1 or 2, and still more preferably 1.

Specific examples of the component (D) include, but are not limited to, 2-(5-chloro-2-benzotriazolyl)-6-tert-butyl-p-cresol, 2-(2'-hydroxy-5'-tert-octylphenyl)benzotriazole, 2-(2'-hydroxy-3'-tert-butyl-5'-methylphenyl)-5-chlorobenzotriazole, 2-(3,5-di-tert-amyl-2-hydroxyphenyl)benzotriazole, and the like.

As the component (D), either a commercially available product or a synthetic product may be used. Specific examples of the commercially available product include, but are not limited to, ADEKA STAB (registered trademark) series LA-36 manufactured by ADEKA Corporation, JF-83 manufactured by Johoku Chemical Industry Co., Ltd., SEESORB (registered trademark) 704 manufactured by Cipro Chemical Co., Ltd., and the like.

Only one kind or a mixture of two or more kinds of the component (D) may be used. It is preferable to use the compound having the skeleton structure represented by the general formula 2 and the compound having the skeleton structure represented by the general formula 3 in combination, and by using these in combination, the yellowness of the photocurable composition can be further lowered.

The addition amount (content) of the component (D) is not particularly limited, but is preferably 0.1 to 5.0 parts by mass, more preferably 0.5 to 5.0 parts by mass, and still more preferably 1.0 to 4.0 parts by mass with respect to 100 parts by mass of the total mass of the components (A) to (C). When the addition amount is 0.1 parts by mass or more, ultraviolet rays that enter the cured material can be further cut. Further, when the addition amount is 5.0 parts by mass or less, the yellow index (yellowness) of the cured material can be further lowered.

In addition, in the case where the component (D-1) and the component (D-2) are used in combination as the component (D), the mass ratio of the component (D-1) to the component (D-2) (component (D-1):component (D-2) (mass ratio)) is not particularly limited, but is preferably 1:9 to 9:1, more preferably 1:9 to 8:2, and still more preferably 2:8 to 4:6.

[Component (E)]

The component (E) used in one aspect of the present invention is a compound having a group represented by the following general formula 4 in the molecule. In a cured material of the photocurable composition according to one aspect of the present invention, the component (E) acts to improve the endurance of the light transmittance and the yellowness while maintaining the low light transmittance and yellowness.

[Chemical Formula 4]

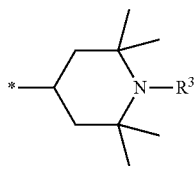

Formula 4

Here, $R^3$ represents hydrogen or a hydrocarbon group, and among these, $R^3$ is preferably hydrogen or a methyl group. Further, * represents a binding site with another partial structure.

The number of the groups represented by the general formula 4 in the molecule of the component (E) is not particularly limited, but it is preferable that the compound has two or more groups in the molecule, it is more preferable that the compound has two or more and six or less groups, it is still more preferable that the compound has two or more and four or less groups, and it is particularly preferable that the compound has two groups.

Examples of the component (E) include, but not limited to, tetrakis(1,2,2,6,6-pentamethylpiperidin-4-yl) 1,2,3,4-butanetetracarboxylate, the compound having two or more groups represented by the general formula 4 in the molecule, in which $R^3$ is a methyl group, bis(2,2,6,6-tetramethyl-4-piperidyl) sebacate, bis(1,2,2,6,6)-pentamethyl-4-piperidyl) sebacate, and the like. Among these, bis(2,2,6,6-tetramethyl-4-piperidyl) sebacate or bis(1,2,2,6,6-pentamethyl-4-piperidyl) sebacate is preferable.

As the component (E), either a commercially available product or a synthetic product may be used. Specific examples of the commercially available product of the component (E) include, but not limited to, ADEKA STAB (registered trademark) series LA-52, LA-57, LA-63P, LA-68, LA-72, LA-77Y, LA-77G, and the like, manufactured by ADEKA Corporation, and JF-90, JF-95, and the like, manufactured by Johoku Chemical Industry Co., Ltd.

Only one kind or a mixture of two or more kinds of the component (E) may be used.

The addition amount (content) of the component (E) is not particularly limited, but is preferably 0.1 to 3.0 parts by mass, more preferably 1.0 to 2.5 parts by mass, and still more preferably 1.0 to 2.0 parts by mass with respect to 100 parts by mass of the total mass of the components (A) to (C). When the addition amount is 0.1 parts by mass or more, it is possible to further inhibit an increase in the light transmittance and the yellowness in the endurance test. Further, when the addition amount is 3.0 parts by mass or less, the light transmittance and the yellowness can be further lowered.

In addition, the total addition amount (total content) of the component (D) and the component (E) is not particularly limited, but is preferably 0.1 to 5.0 parts by mass, more preferably 1.0 to 4.0 parts by mass, and still more preferably 2.0 to 3.0 parts by mass with respect to 100 parts by mass of the total mass of the components (A) to (C). When the total addition amount is 0.1 parts by mass or more, it becomes more difficult for the cured material to transmit ultraviolet rays from the outside. Further, when the total addition amount is 5.0 parts by mass or less, it becomes easy to make a cured material more colorless, and simultaneously, a decrease in the photocurability is further inhibited.

[Other Components]

As other components, additives other than the components (A) to (E), such as a silane coupling agent, a filler such as an inorganic filler, an organic filler, and the like, a storage stabilizer, an antioxidant, a light stabilizer, an adhesion aid, a plasticizer, a dye, a pigment, a flame retardant, a sensitizer, a thermal initiator, a heavy metal deactivator, an ion trapping agent, an emulsifier, a water dispersion stabilizer, an antifoamer, a mold release agent, a leveling agent, a wax, a rheology control agent, a surfactant, and the like may be blended into the sheet-shaped photocurable composition according to one aspect of the present invention within a range that does not impair the purpose of the present invention.

(Silane Coupling Agent)

Specific examples of the silane coupling agent are not particularly limited, but include glycidyl group-containing silane coupling agents such as 2-(3,4-epoxycyclohexyl)ethyltrimethoxysilane, 3-glycidoxypropyltriethoxysilane, 3-glycidoxypropylmethyldimethoxysilane, 3-glycidoxypropyltrimethoxysilane, 3-glycidoxypropylmethyldiethoxysilane, and the like; vinyl group-containing silane coupling agents such as vinyltris(β-methoxyethoxy)silane, vinyltriethoxysilane, vinyltrimethoxysilane, and the like; (meth)acrylic group-containing silane coupling agents such as γ-(meth)acryloxypropyltrimethoxysilane (also known as 3-(meth)acryloxypropyltrimethoxysilane) and the like; amino group-containing silane coupling agents such as N-β-(aminoethyl)-γ-aminopropyltrimethoxysilane, γ-aminopropyltriethoxysilane, N-phenyl-γ-aminopropyltrimethoxysilane, and the like; others such as γ-mercaptopropyltrimethoxysilane, γ-chloropropyltrimethoxysilane, and the like. Among these, the epoxy group- or (meth)acryloyl group-containing silane coupling agents (the glycidyl group-containing silane coupling agent or the (meth)acryloyl group-containing silane coupling agent) are preferably used from the viewpoint that further improved adhesion can be expected. Among these, the (meth)acryloyl group-containing silane coupling agent is more preferable, 3-(meth)acryloxypropyltrimethoxysilane is still more preferable, and 3-methacryloxypropyltrimethoxysilane is particularly preferable. These may be used singly or in combination of two or more kinds thereof. The blending amount (addition amount, content) of the silane coupling agent is not particularly limited, but is preferably 0.01 to 10 parts by mass with respect to 100 parts by mass of the total mass of the components (A) to (E)

(Inorganic Filler)

Specific examples of the inorganic filler are not particularly limited, but include glass powder, fumed silica powder, silica powder, alumina powder, mica powder, silicone rubber powder, calcium carbonate powder, aluminum nitride powder, carbon powder, kaolin clay powder, dry clay mineral powder, dry diatomaceous earth powder, metal powder, and the like. Further, examples of the fumed silica powder among those include those whose surface is chemically modified (hydrophobicized) with organochlorosilanes, polyorganosiloxane, hexamethyldisilazane, and the like. Specific examples of a commercially available product of the fumed silica powder include, but are not limited to, commercially available products such as Aerosil (registered trademark) series R974, R972, R972V, R972CF, R805, R812, R812S, R816, R8200, RY200, RX200, RY200S, R202, and the like, manufactured by Nippon Aerosil Co., Ltd. These may be used singly or in combination of two or more kinds thereof. The blending amount (addition amount, content) of the inorganic filler is not particularly limited, but from the viewpoint of improving the fluidity and the like and further improving the mechanical strength of a cured material, it is preferably 0.1 to 100 parts by mass with respect to 100 parts by mass of the total of the components (A) to (E).

[Solvent]

In one aspect of the present invention, a solvent can be used as necessary to mix the respective components of the photocurable composition and to process the photocurable composition into a sheet shape.

Examples of the solvent include alcohols such as methanol, ethanol, and the like; chlorine-based solvents such as dichloroethane, trichloroethane, and the like; fluorine-based solvents such as trichlorofluoroethane and the like; ketone-based solvents such as acetone, methyl ethyl ketone, methyl isobutyl ketone, and the like; ester-based solvents such as methyl acetate, ethyl acetate, propyl acetate, butyl acetate, and the like; ethers such as dimethyl ether, methyl ethyl ether, and the like; hydrocarbon-based solvents such as pentane, hexane, heptane, cyclohexane, and the like; aromatic solvents such as benzene, toluene, xylene, and the like; and so on. Among these, the ketone-based solvent is preferable, and methyl ethyl ketone is more preferable, in consideration of the compatibility with the component (B) and the component (C).

The addition amount of the solvent is not particularly limited, but is preferably 50 to 200 parts by mass with respect to 100 parts by mass of the total mass of the components (A) to (E). Within this range, it becomes easier to obtain a film thickness of 200 μm or less upon molding into a sheet shape.

[Method for Preparing Photocurable Composition]

The method for preparing a photocurable composition according to an embodiment of the present invention is not particularly limited, and the photocurable composition can be obtained by mixing the respective components by a known mixing method. When mixing, a solvent may be used as described above. In a case where the solvent is used, when the solvent is volatilized during mixing, it is preferable to supplement the volatilized solvent.

As a method for processing the photocurable composition into a sheet shape (a method for preparing a sheet-shaped photocurable composition), a known technique can be used. For example, a method in which a solvent is added to the photocurable composition to prepare a stock solution whose viscosity is intentionally reduced, the stock solution is coated onto a mold-released film whose surface has been release-treated in advance, and then the solvent is dried to perform a processing into a sheet shape may be mentioned.

As the coating step, a known coating method can be used, and specific examples thereof include, but are not limited to, a flow coating method, a roll coating method, a gravure roll method, a wire bar method, a lip die coating method, and the like. Further, as the drying step, a known drying method can be used. A drying device in this step is not particularly limited, a known device can be used, and examples thereof include a hot air drying furnace, an IR furnace, and the like.

The sheet-shaped photocurable composition thus formed as above may be formed on the mold-released film as described above, or the mold-released film may be stuck to the other surface. Further, in a case where the mold-released film is not used at the time of application, or in a case where a mold-released film other than the mold-released film used at the time of application is used, the mold-released film may be stuck to one surface or both surfaces of the sheet-shaped photocurable composition.

A material of the mold-released film is not particularly limited, and examples thereof include plastic films such as polyethylene, polypropylene, polyethylene terephthalate, and polyester films, and the like, paper, cloth, non-woven fabric, and the like. Among these, the plastic films are preferable from the viewpoint of mold releasability. The thickness of the mold-released film is preferably 5 to 300 μm, and more preferably 25 to 200 μm. The mold-released film is preferably one which has been subjected to a mold release treatment with a fluorine-based compound, a silicone-based compound, a long-chain alkyl-based compound, or the like.

Depending on the thickness of the sheet-shaped photocurable composition, the thickness and the colored state of a cured material of the sheet-shaped photocurable composition varies, and the thinner the cured material, the more difficult it is to color. Therefore, the upper limit of the film thickness of the sheet-shaped photocurable composition is not particularly limited, but is preferably 200 μm or less, and more preferably 150 μm or less. In addition, as the sheet-shaped photocurable composition has a higher thickness, the cutting capability of the cured material against ultraviolet rays is proportionally improved. Thus, the lower limit of the film thickness of the sheet-shaped photocurable composition is not particularly limited, but is preferably 10 μm or more. Here, as described above, as a characteristic of the cured material, it is preferable that when a cured material has a thickness of 200 μm or less, in the state of being sandwiched between alkali-free glass plates with a thickness of 0.7 mm, a light transmittance is 5.0% or less at a wavelength of 385 nm, and a yellow index (yellowness) is 3.0 or less. In addition, the alkali-free glass plate is not particularly limited, but for example, 1737, Eagle 2000, Eagle XG, and the like, manufactured by Corning Incorporated, can be used.

<Cured material and Method for Preparing the Same>

The sheet-shaped photocurable composition according to one aspect of the present invention can be cured by irradiation with energy rays such as ultraviolet rays, visible light, and the like. That is, the cured material according to one aspect of the present invention can be prepared by irradiating the sheet-shaped photocurable composition with energy rays such as ultraviolet rays, visible light, and the like.

The contents of the respective constituents derived from the components (A) to (E) and the other components in the cured material will be substantially the same as the contents of the components (A) to (E) and the other components.

The irradiated light used for the irradiation of energy rays is not particularly limited and varies depending on the formulation of the photocurable composition, but irradiated light in the wavelength range of 150 to 750 nm is usually preferable. Further, an irradiation device is not particularly limited and known devices can be used, depending on a desired wavelength, but examples thereof include a low-pressure mercury lamp, a medium-pressure mercury lamp, a high-pressure mercury lamp, an ultrahigh-pressure mercury lamp, a xenon lamp, a metal halide lamp, an LED lamp, and the like. Among these, the high-pressure mercury lamp is preferable from the viewpoint of the characteristics of a light used, for example, viewpoints of curability, curing efficiency, and the like. Irradiation conditions are not particularly limited and vary depending on the formulation of the photocurable composition, but the integrated light amount is usually preferably 1 to 100 kJ/m², more preferably 5 to 70 kJ/m², and still more preferably 10 to 50 kJ/m².

A use of the sheet-shaped photocurable composition according to one aspect of the present invention is not particularly limited, but the sheet-shaped photocurable composition is preferably used for assembling a display device such as a liquid crystal display, an organic EL display, and the like. Specifically, the sheet-shaped photocurable composition according to one aspect of the present invention is suitable for assembling a display element, a cover panel, a touch panel, or the like into a display device, or for assembling an organic EL element itself.

As described above, a mold-released film may be stuck to one surface or both surfaces of the sheet-shaped photocurable composition according to one aspect of the present invention. Here, a step of adhering two transparent adherends using a sheet-shaped photocurable composition having a mold-released film stuck to one surface thereof (adhering step) such as a case where a mold-released film on one surface of a sheet-shaped photocurable composition having mold-released films stuck to both surfaces thereof is peeled, and other cases will be described below.

The adhering step preferably includes a laminating step and a curing step.

In the laminating step, it is preferable that sticking (transferring) is performed while thereof applying pressure and heat with a laminator in the state where one side of the sheet-shaped photocurable composition, not covered by a mold-released film, is attached to one adherend. Further, next, it is preferable that the mold-released film is peeled and the other adherend is stuck with a laminator in the same manner. Here, the laminating pressure is not particularly limited and can be appropriately adjusted. Further, the laminating temperature is not particularly limited, but is preferably 50 to 100° C. As a device used for performing the sticking, a vacuum press machine, a vacuum laminator, an autoclave, or the like which can performing the sticking in vacuum or a reduced pressure atmosphere may be used instead of the laminator. In the curing step, a laminate (laminate constituted with the adherend/the sheet-shaped photocurable composition/the adherend) after lamination can be irradiated with energy rays to cure the sheet-shaped photocurable composition, thereby sticking the two adherends. The details of irradiation with energy rays are the same as those described above.

However, the adhering step is not limited to this.

EXAMPLES

Next, hereinafter, the present invention will be described in more detail with reference to Examples, but the present invention is not limited to these Examples.

Hereinafter, the "photocurable composition" is also simply referred to as a "composition", and the "sheet-shaped photocurable composition" is also simply referred to as a "sheet".

Examples 1 to 4 and Comparative Examples 1 and 2, and Reference Examples 1 to 3

The following respective components were prepared in order to prepare a photocurable composition.
<<Component (A): (Meth)Acrylate Compound>>
A urethane-modified acrylate oligomer (50%-by-mass diluted product of isobornyl methacrylate, weight-average molecular weight of 65,000) (UN-004RU, manufactured by Negami Chemical Industrial Co., Ltd.) having polycarbonate in the main skeleton;
Polyethylene glycol #1000 dimethacrylate (molecular weight of 1,136) (NK ESTER 23G, manufactured by Shin-Nakamura Chemical Co., Ltd.);
Polyethylene glycol #600 dimethacrylate (molecular weight of 736) (NK ESTER 14G, manufactured by Shin-Nakamura Chemical Co., Ltd.).
<<Component (B): Film Forming Resin>>
Mixed type (solid content of 100%) of bisphenol A type phenoxy resin/bisphenol F type phenoxy resin with a weight-average molecular weight of 60,000 (jER (registered trademark) 4250, manufactured by Mitsubishi Chemical Corporation).
<<Component (C): Photoinitiator>>
2,4,6-Trimethylbenzoyl-diphenyl-phosphine oxide (IRGACURE (registered trademark) TPO, manufactured by BASF)
<<Component (D): Compound having a skeleton structure represented by the general formula 1 (ultraviolet absorber)>>
2-(5-Chloro-2-benzotriazolyl)-6-tert-butyl-p-cresol (ADEKA STAB (registered trademark) LA-36, manufactured by ADEKA Corporation);
2-(2'-Hydroxy-5'-tert-octylphenyl)benzotriazole (JF-83, manufactured by Johoku Chemical Co., Ltd.).
<<Component (E): Compound Having a Group Represented by the General Formula 4 in the Molecule>>
Tetrakis(1,2,2,6,6-pentamethylpiperidin-4-yl) 1,2,3,4-butanetetracarboxylate (ADEKA STAB (registered trademark) LA-52, manufactured by ADEKA Corporation);
Compound having two or more groups represented by the general formula 4 in the molecule, in which $R^3$ in the general formula 4 is a methyl group (ADEKA STAB (registered trademark) LA-63P, manufactured by ADEKA Corporation);
Bis(2,2,6,6-tetramethyl-4-piperidyl) sebacate (JF-90, manufactured by Johoku Chemical Co., Ltd.);
Bis(1,2,2,6,6-pentamethyl-4-piperidyl) sebacate (JF-95, manufactured by Johoku Chemical Co., Ltd.).
<<Coupling Agent>>
3-Methacryloxypropyltrimethoxysilane (KBM-503, manufactured by Shin-Etsu Chemical Co., Ltd.).
<<Solvent>>
Methyl ethyl ketone (reagent).

The components (A) to (E), the other components, and the solvent were weighed and added to a stirring vessel, and stirred in an atmosphere at 25° C. for 1 hour. At this time, if methyl ethyl ketone (solvent) was volatilized from the total weight before stirring, a volatilized amount of methyl ethyl ketone was supplemented. The detailed preparation amount was in accordance with Table 1 below. All the numerical values for the addition amount of each component in Table 1 below are expressed in parts by mass. Further, the addition amount (parts by mass) of the component (D) to 100 parts by mass of the total of the components (A) to (C), and the addition amount (parts by mass) of the component (E) with respect to 100 parts by mass of the total of the components (A) to (C) are also shown in Table 1 below. The blank columns in Table 1 indicate that the components were not added.

Using a coating machine, the composition solutions according to Examples 1 to 4, Comparative Examples 1 and 2, and Reference Examples 1 to 3 in Table 1 below were each coated onto a mold-released film with a clearance of 200 μm. Subsequently, the composition was dried at a speed of 500 mm/min through a drying line of 1.5 m in length in an atmosphere at 80° C. and two drying lines of 1.5 m in length in an atmosphere at 110° C. to form the composition into a sheet shape.

Thereafter, another mold-released film was stuck to the surface of the sheet (composition) to manufacture a laminated sheet having two types of mold-released films provided on both surfaces of the composition.

With regard to the obtained sheet, the film thickness inclusive of the mold-released film was measured having a thickness gauge, and the thicknesses of the two types of the mold-released films known in advance were subtracted therefrom to calculate the thickness of the sheet (composition). This value is shown in Table 1 below as "Film thickness (after drying)". The unit of the film thickness in Table 1 below is (μm).

In addition, in drying for volatilizing the solvent, the solvent is dried from the surface, and thus, it becomes difficult for the internal solvent to volatilize. Therefore, from the viewpoint that when the film thickness is increased, bubbles remain inside the coating film, it is preferable that the clearance is 300 μm or less (lower limit: more than 0 μm).

film was peeled, an alkali-free glass plate with a thickness of 0.7 mm×a width of 100 mm×a length of 100 mm was attached to the peeled surface of the composition, and subjected to transferring using a heat roll laminator with a roll temperature set to 80° C. Subsequently, the other mold-released film was peeled from the laminated sheet on the alkali-free glass plate, and the same alkali-free glass plate as described above was stuck to the peeled surface of the composition, and subjected to sticking in an atmosphere of 80° C., using a vacuum laminator. Then, using a belt conveyor type ultraviolet irradiator, the laminated sheet was irradiated with ultraviolet rays in an integrated light amount of 30 kJ/m² by a high-pressure mercury lamp to manufacture a test piece in which two sheets of alkali-free glass were stuck with a sheet (that is, two sheets of alkali-free glass were adhered via a cured material of the sheet (composition)).

[Measurement of Light Transmittance (after Curing)]

Using the test piece manufactured above, measurement of a light transmittance according to visible/ultraviolet spectroscopy was performed using a visible/ultraviolet spectrophotometer UV-2450 manufactured by Shimadzu Corporation. Specifically, measurement of a light transmittance at

TABLE 1

| Component | Raw material | Example 1 | Example 2 | Example 3 | Example 4 | Comparative Example 1 | Comparative Example 2 | Reference Example 1 | Reference Example 2 | Reference Example 3 |
|---|---|---|---|---|---|---|---|---|---|---|
| Component (A) | UN-004RU | 96 | 96 | 96 | 96 | 96 | 96 | 96 | 96 | 96 |
| | NK ESTER 23G | 13 | 1.3 | 1.3 | 1.3 | 1.3 | 1.3 | 1.3 | 1.3 | 1.3 |
| | NK ESTER 14G | 2.7 | 2.7 | 2.7 | 2.7 | 2.7 | 2.7 | 2.7 | 2.7 | 2.7 |
| Component (B) | jER4250 | 34 | 34 | 34 | 34 | 34 | 34 | 34 | 34 | 34 |
| Component (C) | TPO | 1 | 1 | 1 | 1 | 1 | 1 | 1 | 1 | 1 |
| Component (D) | LA-36 | 0 8 | 0.8 | 0.8 | 0.8 | | 0.8 | | 0.8 | |
| | JF-83 | 1.3 | 1.3 | 1.3 | 1.3 | | 1.3 | | | 0.8 |
| Component (E) | LA-52 | 1.5 | | | | | | | | |
| | LA-63P | | 1.5 | | | | | | | |
| | JF-90 | | | 1.5 | | | | | | |
| | JF-95 | | | | 1.5 | 1.5 | | | | |
| Coupling agent | KBM-503 | 1.3 | 1.3 | 1.3 | 1.3 | 1.3 | 1.3 | 1.3 | 1.3 | 1.3 |
| Solvent | Methyl ethyl ketone | 140 | 140 | 140 | 140 | 140 | 140 | 140 | 140 | 140 |
| Total | | 279.9 | 279.9 | 279.9 | 279.9 | 277.8 | 278.4 | 276.3 | 277.1 | 277.1 |
| Addition amount of component (D) with respect to 100 parts by mass of total of components (A) to (C) | | 1.6 | 1.6 | 1.6 | 1.6 | 0.0 | 1.6 | 0.0 | 0.6 | 0.6 |
| Addition amount of component (E) with respect to 100 parts by mass of total of components (A) to (C) | | 1.1 | 1.1 | 1.1 | 1.1 | 1.1 | 0.0 | 0.0 | 0.0 | 0.0 |
| Film thickness (after drying) | | 150 | 150 | 150 | 150 | 150 | 150 | 150 | 150 | 150 |

By the methods as shown below, using the laminated sheets formed from the compositions according to Examples 1 to 4, Comparative Examples 1 and 2, and Reference Examples 1 to 3, measurement of a light transmittance (after curing) and measurement of a yellowness (after curing) were performed, an endurance test was performed, and measurement of a light transmittance (after curing) and measurement of the yellowness (after curing) after a lapse of time under each test environment which will be described later were performed. Hereinbelow, the Nos. of the compositions in Table 1 above are also reflected as they are on the sheets, and using the Nos. as the sheet Nos., the measurement results on the light transmittance and the measurement results on the yellowness are shown in Table 2 below and Table 3 below, respectively.

[Manufacture of Test Piece]

Manufacture of a test piece is performed as follows. With regard to a laminated sheet from which one mold-released wavelengths of the range of wavelength 800 nm to 300 nm was performed, and the light transmittance (%) at a wavelength of 385 nm was read. Then, with a number of tests set to n=3, an average value was calculated, and evaluation of the results was performed in terms of "Light transmittance (after curing) (unit: %)" according to the following evaluation criteria. In the present evaluation, the light transmittance at a wavelength of 385 nm for sufficiently cutting the ultraviolet rays that damage the adherend is 5% or less, preferably 3% or less, and most preferably 1% or less. In addition, the present measurement is in accordance with JIS K7373-2006. The evaluation results are shown in the column of "Initial stage" in Table 2 below.

[Measurement of Yellowness (Yellow Index) (after Curing)]

Using the test piece manufactured above, measurement of a yellowness according to a visible/ultraviolet spectroscopy method was performed using a visible/ultraviolet spectrophotometer UV-2450 manufactured by Shimadzu Corporation. Specifically, measurement of a light transmittance at wavelengths of the range of 800 nm to 300 nm was performed, and the yellowness was calculated in accordance with JIS K 7373-2006. With a number of tests set to n=3, an average value was calculated, and evaluation of the results was performed in terms of "Yellowness (after curing)" according to the following evaluation criteria. The yellowness for realizing colorlessness and transparency is preferably 3.0 or less. The evaluation results are shown in the column of "Initial stage" in Table 3 below.

[Endurance Test (after Curing)]

For the sheets formed from the photocurable compositions according to Examples 1 to 4, Comparative Examples 1 and 2, and Reference Examples 1 to 3, the endurance test was performed for 300 hours, 500 hours, 800 hours, and up to at most 1,000 hours under each of the conditions of:

60° C.×95% RH (condition 1), and

85° C.×85% RH (condition 2) as a high-temperature and high-humidity test, and

40° C.×70% RH (irradiance filter: 340 nm, lamp power: 0.55 W/m², 102-minute irradiation, and then 18-minute irradiation and water spray) (accelerated weather resistance tester (weather meter) weather-O-meter manufactured by Toyo Seiki Seisakusho Co., Ltd. (Condition 3) as an environmental test.

Then, the measurement of a light transmittance (after curing) and the measurement of a yellowness (after curing) were performed as test items after a lapse of time under each test environment. The evaluation results of measurement of a light transmittance (after curing) after a lapse of time under each test environment and the evaluation results of the measurement of a yellowness (after curing) after a lapse of time under each test environment are shown in Table 2 below and Table 3 below, respectively. In addition, the units of the results for an initial stage, 300 hours, 500 hours, 800 hours, and 1,000 hours in Table 2 below are %.

Furthermore, for each evaluation result of the measurement of a light transmittance (after curing) and the measurement of a yellowness (after curing), a ratio (%) of a value obtained by subtracting an initial value (value in the column of "Initial stage") from a value in the column of "1,000" hours relative to a value after 1,000 hours of the endurance test (value in the column of "1,000" hours) (that is, a value (%) calculated by {[(Value in the column of "1,000" hours)−(Value in the column of "Initial")]/(Value in the column of "1,000" hours)}×100) was calculated, and this value was summarized as "Change rate (%)" in Tables 2 and 3 below.

Moreover, when both the initial value of the light transmittance and the initial value of the yellowness are not good (that is, the evaluation result of the light transmittance (after curing) is more than 5%, the evaluation result of the yellowness (after curing) is more than 3.0, or both of them), the endurance test was not performed, and are noted as "-" in the column of "Change rate" in Tables 2 and 3 below.

Here, the change rate in light transmittance was evaluated according to the following evaluation criteria:

the change rate under 60° C.×95% RH which is Condition 1 is preferably in the range of −15% to 15%, and more preferably in the range of −10% to 10%;

the change rate under 85° C.×85% RH which is Condition 2 is preferably in the range of −15% to 15%, and more preferably −12% to 12%; and the change rate with the accelerated weather resistance tester (weather meter) which is Condition 3 is preferably in the range of −25% to 25%.

Furthermore, the change rate in the yellowness was evaluated according to the following evaluation criteria:

the change rate under 60° C.×95% RH which is Condition 1 is preferably in the range of −15% to 15%, and more preferably in the range of −10% to 10%;

the change rate under 85° C.×85% RH which is Condition 2 is preferably in the range of −35% to 35%, and more preferably in the range of −10% to 10%; and the change rate with the accelerated weather resistance tester (weather meter) which is Condition 3 is preferably in the range of −200% to 200%, and more preferably in the range of −180% to 180%.

TABLE 2

Evaluation results of initial stage and endurance tests for measurement of light transmittance (after curing)

| | Condition | Initial stage | 300 hours | 500 hours | 800 hours | 1000 hours | Change rate |
|---|---|---|---|---|---|---|---|
| Example 1 | Condition 1 | 0.46 | 0.44 | 0.45 | 0.45 | 0.46 | −0.8 |
| | Condition 2 | 0.51 | 0.50 | 0 52 | 0.54 | 0.55 | 7.3 |
| | Condition 3 | 0.46 | 0.41 | 0.41 | 0.4 | 0.41 | −12.1 |
| Example 2 | Condition 1 | 0.55 | 0.55 | 0.54 | 0.53 | 0.52 | −4.6 |
| | Condition 2 | 0.50 | 0.49 | 0.49 | 0.51 | 0.51 | 2.3 |
| | Condition 3 | 0.51 | 0.50 | 0.49 | 0.49 | 0.48 | −4.9 |
| Example 3 | Condition 1 | 0.41 | 0.43 | 0.44 | 0.43 | 0.43 | 5.7 |
| | Condition 2 | 0.53 | 0.55 | 0.57 | 0.58 | 0.59 | 10.7 |
| | Condition 3 | 0.48 | 0.41 | 0.41 | 0.41 | 0.40 | −15.5 |
| Example 4 | Condition 1 | 0.64 | 0.60 | 0.63 | 0.62 | 0.62 | −3.7 |
| | Condition 2 | 0.52 | 0.56 | 0.55 | 0.56 | 0.57 | 9.6 |
| | Condition 3 | 0.55 | 0.46 | 0.44 | 0.43 | 0.43 | −21.7 |
| Comparative Example 1 | — | 85.30 | — | — | — | — | — |
| Comparative Example 2 | Condition 1 | 0.39 | 0.45 | 0.45 | 0.48 | 0.46 | 17.9 |
| | Condition 2 | 0.45 | 0.46 | 0.46 | 0.51 | 0.54 | 20.0 |
| | Condition 3 | 0.43 | 0.63 | 0.72 | 0.70 | 0.68 | 58.1 |
| Reference Example 1 | — | 86.51 | — | — | — | — | — |
| Reference Example 2 | — | 24.85 | — | — | — | — | — |
| Reference Example 3 | — | 0.04 | — | — | — | — | — |

TABLE 3

Evaluation results of initial stage and endurance tests for measurement of yellowness (after curing)

| | Condition | Initial stage | 300 hours | 500 hours | 800 hours | 1000 hours | Change rate |
|---|---|---|---|---|---|---|---|
| Example 1 | Condition 1 | 2.19 | 2.24 | 2.20 | 2.19 | 2.32 | 5.8 |
| | Condition 2 | 2.06 | 2.40 | 2.44 | 2.47 | 2.69 | 30.2 |
| | Condition 3 | 2.12 | 4.41 | 5.12 | 5.19 | 5.78 | 173.1 |
| Example 2 | Condition 1 | 1.97 | 1.93 | 1.97 | 1.99 | 2.12 | 7.7 |
| | Condition 2 | 2.02 | 2.27 | 2.32 | 2.37 | 2.59 | 28.5 |
| | Condition 3 | 1.98 | 3.56 | 4.21 | 4.30 | 4.79 | 142.3 |
| Example 3 | Condition 1 | 2.39 | 2.31 | 2.11 | 2.1 | 2.18 | −8.7 |
| | Condition 2 | 2.18 | 2.02 | 1.88 | 1.85 | 1.98 | −9.3 |
| | Condition 3 | 2.30 | 3.99 | 4.11 | 4.39 | 5.19 | 125.6 |
| Example 4 | Condition 1 | 2.22 | 2.20 | 2.10 | 2.14 | 2.20 | −0.7 |
| | Condition 2 | 2.40 | 2.35 | 2.20 | 2.32 | 2.42 | 0.8 |
| | Condition 3 | 2.27 | 4.42 | 5.25 | 5.53 | 5.98 | 163.7 |
| Comparative Example 1 | — | 0.97 | — | — | — | — | — |
| Comparative Example 2 | Condition 1 | 2.40 | 2.81 | 2.81 | 2.92 | 2.95 | 23.1 |
| | Condition 2 | 2.43 | 3.19 | 3.14 | 3.31 | 3.39 | 39.4 |
| | Condition 3 | 2.43 | 4.69 | 4.99 | 6.07 | 6.77 | 178.4 |
| Reference Example 1 | — | 0.83 | — | — | — | — | — |
| Reference Example 2 | — | 2.02 | — | — | — | — | — |
| Reference Example 3 | — | 3.68 | — | — | — | — | — |

In Table 2 above, it was confirmed that the sheet-shaped photocurable compositions according to Comparative Example 1 and Reference Examples 1 and 2 have a high initial light transmittance of cured materials thereof and have difficulty in sufficiently cutting ultraviolet rays from the outside.

Furthermore, in Table 3 above, it was confirmed that the sheet-shaped photocurable composition according to Reference Example 3 had a high initial yellowness of a cured material thereof.

On the other hand, from the results of the endurance tests under the conditions 1 to 3 for the cured materials of the sheet-shaped photocurable compositions according to the remaining Examples 1 to 4 and Comparative Example 2, it was confirmed that in the light transmittance, only Examples 1 to 4 simultaneously satisfied the change rate under 60° C.×95% RH was in the range of −15% to 15%, the change rate under 85° C.×85% RH was in the range of −15% to 15%, and the change rate with the accelerated weather resistance tester (weather meter) in the range of −25% to 25%.

Furthermore, from the results of the endurance tests under the conditions 1 to 3 for the cured materials of the sheet-shaped photocurable compositions according to the remaining Examples 1 to 4 and Comparative Example 2, it was confirmed that in the yellowness, only Examples 1 to 4 simultaneously satisfied the change rate under 60° C.×95% RH was in the range of −15% to 15%, the change rate under 85° C.×85% RH was in the range of −35% to 35%, and the change rate with the accelerated weather resistance tester (weather meter) in the range of −200% to 200%.

From the above-mentioned results, it was confirmed that with the photocurable composition including the components (A) to (E) according to the present invention, a cured material thereof has a low light transmittance and a low yellowness, and also has a high endurance even in the light transmittance and the yellowness.

INDUSTRIAL APPLICABILITY

The present invention can be used for assembling a display device such as a liquid crystal display, an organic EL display, and the like. Specifically, the present invention is suitable for assembling a display element, a cover panel, a touchpanel, or the like into a display device, or for assembling an organic EL element itself, and thus, it can inhibit the deterioration of the organic EL element due to ultraviolet rays from the outside.

This application is based on Japanese Patent Application No. 2018-103020, filed on May 30, 2018, the disclosure content of which is hereby incorporated as its entirety by reference.

The invention claimed is:

1. A sheet-shaped photocurable composition comprising the following components (A) to (E):
   a component (A): a (meth)acrylate compound,
   a component (B): a film forming resin,
   a component (C): a photoinitiator,
   a component (D) a compound having a skeleton structure represented by the following general formula 1:

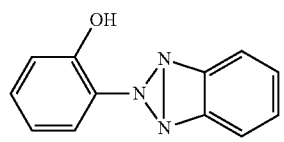

a component (E) a compound having a group represented by the following general formula 4:

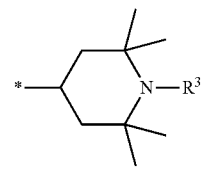

wherein R³ represents hydrogen or a hydrocarbon group, and * represents a binding site with another partial structure, the component (A) comprises a urethane-modified (meth)acrylate oligomer and a (meth)acrylate monomer as the (meth)acrylate compound, the film forming resin of the component (B) is a phenoxy resin, the sheet-shaped photocurable composition has no fluidity at 25° C., and the sheet-shaped photocurable composition is configured to be curable by a curing method, and the curing method consists of irradiation with energy rays.

2. The sheet-shaped photocurable composition according to claim 1, wherein the component (D) includes the following component (D-1) and the following component (D-2):

a component (D-1): a compound having a skeleton structure represented by the following general formula 2:

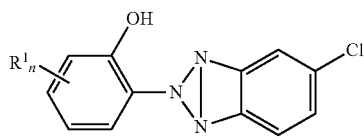

wherein $R^1_n$ represents the presence of n $R^1$ groups, each $R^1$ independently represents a hydrocarbon group, and n represents an integer of 0 to 4, a component (D-2): a compound having a skeleton structure represented by the following general formula 3:

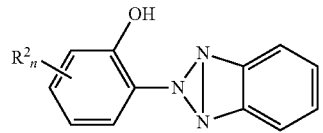

wherein $R^2_n$ represents the presence of n $R^2$ groups, each $R^2$ independently represents a hydrocarbon group, and n represents an integer of 0 to 4.

3. The sheet-shaped photocurable composition according to claim 1, wherein the component (E) includes a compound having two or more groups represented by the general formula 4 in the molecule.

4. The sheet-shaped photocurable composition according to claim 1, wherein the total of the component (D) and the component (E) is 0.1 to 5.0 parts by mass with respect to 100 parts by mass of the total mass of the components (A) to (C).

5. The sheet-shaped photocurable composition according to claim 1, consisting of the components (A) to (E) and a silane coupling agent.

6. A cured material of the sheet-shaped photocurable composition according to claim 1.

* * * * *